June 27, 1967 J. S. ARNOLD ETAL 3,328,753

SOUND COMMUNICATION SYSTEM

Filed July 6, 1964

INVENTORS
JAMES S. ARNOLD
JOSEPH A. KOCHLY
VINCENT SALMON
COYE T. VINCENT
BY Samuel Lindenberg
ATTORNEY United States Patent Office 3,328,753
Patented June 27, 1967

3,328,753

SOUND COMMUNICATION SYSTEM

James S. Arnold, Palo Alto, Joseph A. Kochly, San Carlos, Vincent Salmon, Menlo Park, and Coye T. Vincent, Los Altos, Calif., assignors to Stanford Research Institute, Menlo Park, Calif., a corporation of California Filed July 6, 1964, Ser. No. 380,234
2 Claims. (Cl. 340—15)

This invention relates to coherent elastic wave communication systems and apparatus, and more particularly to improvements therein.

This invention provides a new communications method and apparatus, by providing for the efficient communication of coherent elastic waves through solid media such as the earth, and for enabling the facile transmittal and reception of the information-carrying waves.

The present invention provides a system of communication using the earth as a signal carrying medium. By means of this invention, localities which are separated by mountainous terrain and which may not easily communicate by radio waves or hard-to-lay telephone lines, may establish reliable communications. Information links requiring a minimum of initial investment and upkeep can easily be provided in many situations where other systems either don't work or are too expensive.

Accordingly, one object of the present invention is to provide a novel communication system.

Another object of the present invention is to provide an efficient transducer assembly for creating information-carrying waves in a solid medium such as that of the solid earth.

Still another object is to provide an efficient transducer arrangement (or array) for transmitting or receiving information bearing waves traveling in preferred directions in a solid medium.

Yet another object is to provide an efficient sound receiving transducer for detecting the sound waves passing through a solid medium such as that of the solid earth.

These and other objects may be achieved in an arrangement of transmitter and receiver transducers embedded in the earth at distant locations. Both the receiver and transmitter transducers may have the same construction comprising electrostrictive material embedded in a rigid composition and firmly cemented into a hole drilled into the earth, and preferably in solid rock. A transmitting transducer or transducer array may be energized in a predetermined phase relationship which generates elastic waves in the earth of maximum strength in the direction of a location of a receiving station. An embedded receiving or transducer array detects the waves and completes the communications link. Modulated or unmodulated continuous wave signals, as well as pulse signals in the sonic and ultrasonic range, may be transmitted and received in accordance with this invention. Also voice frequency signals may be directly transmitted and received.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
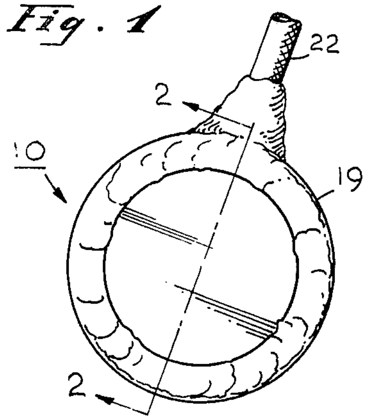
FIGURE 1 is a side view of a transducer assembly constructed in accordance with the present invention.
Figure 2:
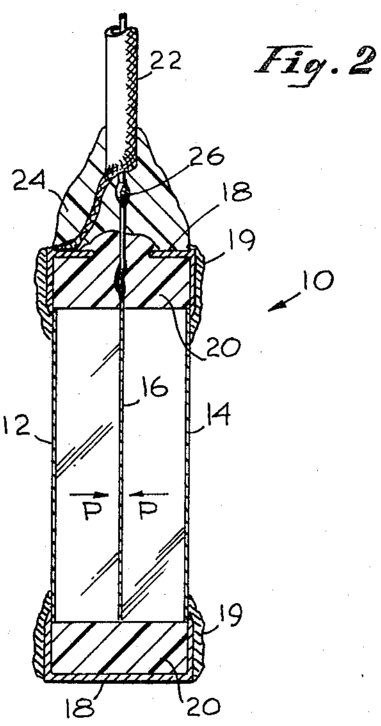
FIGURE 2 is a sectional view along the lines 2—2 of the transducer assembly of FIGURE 1.

Reference is now made to FIGURE 1 and FIGURE 2 of the drawings which show a transducer 10 for generating elastic waves in a solid medium. In a preferred embodiment a transducer 10 comprises two short cylinders 12 and 14 of an electrostrictive material such as polarized barium titanate for generating elastic waves. The opposite flat faces are silvered to provide electrodes on these surfaces. The cylinders 12 and 14 are so arranged that their directions of polarization P are oppositely directed. The internal electrodes of the two cylinders are cemented together face-to-face with an electrically conductive substance 16, such as silver epoxy. The cemented cylinders are contained within a shield 18 of conductive material such as aluminum, which extends around their circular periphery, and the space between the cylinders and the shield walls are occupied by a nonconductive cement 20 such as a catalyzed resin. The shield 18 is connected to the electrodes on the outer faces of the cylinders 12, 14 by means of silver epoxy 19. A coaxial cable 22 is attached to the transducer 10, the shield conductor 24 of the cable being connected to the shield 18 and the inner conductor 26 extending through the cement 20 and disposed in electrical contact with the internal electrodes of the cylinders 12 and 14.

When a voltage is applied to the cable 22, a potential is created between the electrodes of the transducer elements. Inasmuch as the cylinders 12 and 14 are of an electrostrictive substance, they change dimensions and thereby produce an elastic wave which is transmitted into any medium surrounding the case.

Figure 3:
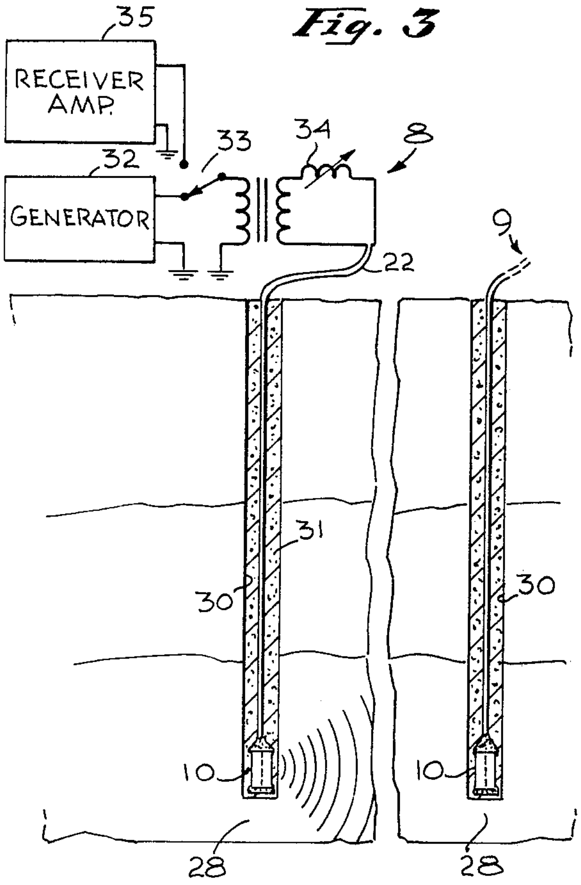
FIGURE 3 is a partial schematic, partial sectional view of transducer installations constructed in accordance with the present invention.

FIGURE 3 shows two simple identical installations 8 and 9 for transmitting and receiving pressure waves through a solid rock formation 28 in the earth. The transducers 10 of each installation are contained at the bottom of deep holes 30 formed in the rock by drilling. The holes are filled with a hard encasing cement 31, preferably of the type that expands when solidifying, thereby to obtain a very rigid coupling assuring the efficient transmittal of pressure waves.

The generation of elastic waves in the rock 28 is accomplished by first generating electrical signals in the generator 32. These signals may be of a variety of types such as interrupted continuous wave signals for code transmission, direct speech signals, or a carrier signal modulated by an information signal. The generator 32 may be a microphone and amplifier combination or any of numerous well known devices for generating electrical signals. The signals from the generator 32 are carried through a switch 33 and are coupled to the coaxial cable 22 through a variable inductor 34. The purpose of the inductor 34 is to compensate for the highly capacitive transduced so that the power delivered by the generator 32 may be efficiently used by the transducer.

The signals transmitted through the cable 22 cause the cylinders 12 and 14 to contract and expand in accordance with the strength and frequency of the signals. Elastic waves are thereby established which travel through the earth to the other transducer 10 located at a distant station 9 which is in contact with rock formation 28.

When the transducer 10 is to be used as a detector, the coaxial cable 22 is connected to a receiver-amplifier 35 by operating the switch 33. The output of the receiver-amplifier 35 may be used to operate a loudspeaker, demodulator, or other device of similar nature. Although the same transducer 10 may be used for transmitting and receiving, for convenience, separate transducers may be used. However, maximum efficiency of a receiving transducer of the piezoelectric or electrostrictive type is generally obtained by surrounding the transducer element in a rigid assembly firmly cemented in a hole, as for the described transmitting transducer.

The efficiency of elastic wave transmission through a rock medium requires an impedance match between the transducer element and the high impedance rock, and the provision of good elastic wave coupling therebetween. The electrostrictive cylinders 12 and 14 of the transducer 10 have a wave impedance comparable to that of rock and therefore no impedance transformation from transducer to rock is necessary. The major requirement in the installation of the transducer assembly is therefore the provision of good coupling. The coupling of a transducer to the earth is accomplished by surrounding the transducer 10 with hard cement 31 in a deep hole 30, so that there are no air or water pockets to interfere in the transmission of elastic wave energy. The solid coupling means provided are superior to liquids which have often been proposed for transmitting pressure wave energy. The efficiency of solid couplants is partly due to the fact that their impendance can be approximately equal to that of transducer and rock. Furthermore, the solids resist flow while liquids, of course, do not. The requirement of rigidly cementing the transducer in place for maximum coupling applies also to receiving transducers.

In order to prevent undue energy dissipation, the transducer must be embedded in competent (continuous and homogeneous) rock. The interference effects from free surfaces, or strata interface, must be considered in the design of the system.

In order to transmit elastic waves efficiently, the transmitted waves should generally be directed toward the receiving station. In the transducer 10, the elastic wave energy is radiated from the plane surface. For typical conditions, the transducer is small compared to a wavelength, hence the radiation pattern will be isotropic (uniform). To obtain the desired directivity, an array of transducers must be used.

Figure 4:
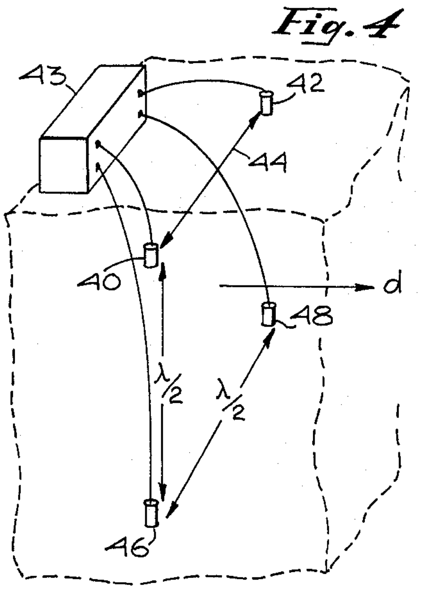
FIGURE 4 is a view of a transducer arrangement for transmitting or receiving pressure waves traveling in preferred directions.

An arrangement of transducers which is highly directive for a predetermined frequency is shown in FIGURE 4. For any two transducers 40 and 42 separated by half a wavelength, denoted $\lambda/2$, radiation is a maximum in a plane perpendicular to a line 44 joining the transducers, when the transducer driving voltages obtained from generator 43 are in phase. For a phase angle of $\pi$ or 180°, radiation is a maximum in the direction of the line 44 joining the transducers. Other phase angles between 0 and $\pi$ cause a maximum radiation along cones centered around the line 44. Increased directivity is obtained by providing many transducers, separated by half a wavelength and energized by voltages which are all in phase. Of course, the directivity will be obtained only for a certain frequency, so the arrangement is primarily useful for the transmittal of a narrow band of frequencies as in the case of a modulated or interrupted carrier wave.

Radiated energy may be directed in any desired azimuth direction by a rectangular arrangement of transducers illustrated in FIGURE 4. Each transducer 40, 42, 46, and 48 is separated from the transducers closest to it by a distance of one-half wavelength, and the phase relationships of the signals to the transducers are chosen according to the desired direction of transmittal. If all transducers are energized in phase, the direction of maximum radiated energy is in the direction of the arrow *d*. The rectangular arrangement is useful for selectively transmitting information to any one of several receiving stations located in different directions. If information is to be always transmitted in the same direction, a group of transducers arranged in a line pointing toward the receiver and energized by voltages out of phase by $\pi$ degrees may be used.

An arrangement of transducers for transmitting elastic waves in preferred directions is also useful for detecting waves received only from certain directions. The detecting apparatus should then include means for detecting only signals of a certain phase relationship, characteristic of waves traveling in the selected direction.

By way of illustration, and not to be construed as a limitation, a communication system, made in accordance with the teachings of this invention, including a transmitting and receiving transducer each being constructed of two short cylinders of barium titanate, each cylinder being a diameter of one and one-half inches and a thickness of ⅜". The cylinders were cemented together with silver epoxy and placed in an aluminum ring, the space between the cylinders and ring being filled with a catalyzed liquid resin. The transducers were installed in rock by drilling holes 2¼" in diameter and five feet deep. The transducers were placed in the bottom of the holes and the holes were filled with Hydracal gypsum cement manufactured by the United States Gypsum Company, a cementing material which expands when solidified. Modulated signals were applied to the transmitting transducer employing an amplifier with an output of approximately one hundred watts. These were detected by a similar transducer located 1400 feet away. Continuous wave carrier signals over a frequency range up to 32,000 cycles per second, pulse signals as well as voice signals were transmitted and received.

This invention may also be used for detection of interfaces discontinuities, or objects analogous to "targets" much in the manner of a radar system. Using an array of transducers, as shown in FIGURE 4, by proper phasing of the signals applied to the transducers, the direction of the transmitted signals is determined. The "echoes" received from interfaces, discontinuities, etc., after the transmission of coherent pulse signals may be interpreted in the manner of radar signals, to determine distance and direction of the target. The signal transmitter and signal receiver may be coupled to the receiver array by means of any suitable switching arrangement analogous to the well known T-R switch of radar systems.

While particular embodiments of the invention have been described in detail, many variations and modifications thereof may be employed without departing from the spirit and scope of the claims which follow herein.

What is claimed is:

1. A directional transducer installation for use in connection with the conduction of elastic waves of a predetermined frequency through a solid medium having the property of supporting elastic waves comprising:

walls forming at least two holes in said solid medium;

an electrostrictive transducer disposed in each of said holes, said transducers being located a distance apart approximately equal to one-half the wavelength in said solid medium of elastic waves of said predetermined frequency;

signal applying means extending through said holes and connected to said transducers for delivering signals to said transducers which are 180° out of phase whereby elastic waves are transmitted in greatest strength in the direction of a line connecting said transducers; and cementing means disposed in said holes for completely filling the space between said transducers and adjacent walls of said holes and coupling said transducers to said solid medium.

2. A transducer for use in connection with the transmittal of elastic waves through a medium comprising:

two adjacent cylinders of an electrostrictive material arranged with their directions of polarization oppositely directed, each said cylinder having opposite flat faces, a conductive coating on each said flat face forming an electrode thereon;

an electrically conductive cement disposed between said cylinders in cementing relationship therewith;

a conductive shield disposed about said cylinders and spaced therefrom;

electrically insulating rigid cement means disposed between said cemented cylinders and said shield and completely filling the space therebetween; and electrical conductors connected to said shield and the electrodes on said cylinders.

References Cited

UNITED STATES PATENTS

| | | | |
|---|---|---|---|
| 1,333,095 | 3/1920 | Roe | 325—28 X |
| 1,919,917 | 7/1933 | Truman | 181—.5 X |
| 2,276,335 | 3/1942 | Peterson | 181—.5 |
| 2,378,687 | 6/1945 | Chamberlain | 166—29 |
| 2,653,220 | 9/1953 | Bays | 325—28 X |
| 2,745,507 | 5/1956 | Bodine | 181—.5 |
| 2,989,725 | 6/1961 | Miller | 340—10 X |
| 3,068,446 | 12/1962 | Ehrlich et al. | 340—10 X |

BENJAMIN A. BORCHELT, *Primary Examiner.*

P. A. SHANLEY, *Assistant Examiner.*